United States Patent
Egawa (10) Patent No.: US 7,990,453 B2
(45) Date of Patent: Aug. 2, 2011

(54) SOLID-STATE IMAGE SENSOR AND SIGNAL PROCESSING METHOD THEREOF

(75) Inventor: Yoshitaka Egawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 608 days.

(21) Appl. No.: 12/114,260

(22) Filed: May 2, 2008

(65) Prior Publication Data

US 2008/0278612 A1 Nov. 13, 2008

(30) Foreign Application Priority Data

May 10, 2007 (JP) ................. 2007-125852

(51) Int. Cl.
*H04N 3/14* (2006.01)
*H04N 5/335* (2011.01)

(52) U.S. Cl. ....................................... 348/306

(58) Field of Classification Search ............ 348/306
See application file for complete search history.

(56) References Cited

U.S. PATENT DOCUMENTS

| 6,674,470 B1 | 1/2004 | Tanaka et al. | |
|---|---|---|---|
| 6,912,003 B1 * | 6/2005 | Apel et al. | 348/243 |
| 2003/0202111 A1 * | 10/2003 | Park | 348/243 |

FOREIGN PATENT DOCUMENTS

| JP | 10-150182 | 6/1998 |
|---|---|---|
| JP | 2004-349985 | 12/2004 |
| JP | 2005-94093 | 4/2005 |

* cited by examiner

*Primary Examiner* — Sinh Tran
*Assistant Examiner* — Dillon Durnford-Geszvain
(74) *Attorney, Agent, or Firm* — Oblon, Spivak, McClelland, Maier & Neustadt, L.L.P.

(57) ABSTRACT

A solid-state image sensor includes a pixel section that outputs a signal charge subjected to photoelectric conversion by each of a plurality of photoelectric transducers, a conversion circuit that converts an output signal from the pixel section into a digital signal by using a triangular wave, and a saturation signal level calculation circuit that calculates a saturation signal level of each photoelectric transducer based on the digital signal from the conversion circuit. The solid-state image sensor further includes a setting circuit which sets a maximum signal level of the triangular wave in accordance with the saturation signal level from the saturation signal level calculation circuit.

6 Claims, 8 Drawing Sheets

SOLID-STATE IMAGE SENSOR AND SIGNAL PROCESSING METHOD THEREOF

CROSS-REFERENCE TO RELATED APPLICATIONS

This application is based upon and claims the benefit of priority from prior Japanese Patent Application No. 2007-125852, filed May 10, 2007, the entire contents of which are incorporated herein by reference.

BACKGROUND OF THE INVENTION

1. Field of the Invention

The present invention relates to a solid-state image sensor and a signal processing method thereof. More particularly, the present invention relates to a complementary metal oxide semiconductor (CMOS) image sensor for use in, e.g., a camera-equipped mobile phone, a digital camera, or a video camera, and a signal processing method for calculation of a saturation signal level in the image sensor.

2. Description of the Related Art

As is well known, in charged coupled device (CCD) and CMOS image sensors, miniaturization of pixels has been advanced. At the present day, a cell having an area (cell size) of 2×2 μm or below, e.g., 1.75×1.75 μm or 1.4×1.4 μm has been developed. In such a development, a CMOS image sensor adopting a so-called vertical two-pixel one-cell structure to substantially increase an area of a photodiode (PD) has been already proposed to improve degradation in sensitivity of fine pixels (see, e.g., Jpn. Pat. Appln. KOKAI Publication No. 10-150182).

In general, when an area of a photodiode is reduced, a saturation electron number in an image sensor is greatly decreased. A decrease in the saturation electron number increases a ratio of shot noise that occurs due to a fluctuation of light (=$\sqrt{electron number}$) and degrades the signal-to-noise ratio. Therefore, improving sensitivity of final pixels (improving the saturation electron number in the image sensor) has been demanded.

Here, the saturation electron number in the image sensor is usually set while considering a manufacturing process, an environmental temperature, a fluctuation in a power supply voltage, and others. For example, in case of a device that performs analog-to-digital conversion processing of 10 bits, a minimum saturation electron number in the worst operation environment is set as a saturation electron number in the sensor so that a digital signal on a 1023-LSB level as a maximum value of 10 bits can be obtained. The minimum saturation electron number in this case corresponds to approximately 60 to 70% of a saturation electron number with respect to conditions, a room temperature, and a standard power supply voltage near the center of a fluctuation in a general manufacturing process. The saturation electron number has particular large temperature dependence. For example, the saturation electron number is reduced at a high temperature of 60° C. (temperature characteristic compensation). Therefore, the saturation electron number of the sensor is set to a considerably low level. For example, the minimum saturation electron number is set to 6000 electrons in case of a device whose saturation electron number is 10000 electrons, and the same is set to 3000 electrons in case of a device whose saturation electron number is 5000 electrons.

BRIEF SUMMARY OF THE INVENTION

According to a first aspect of the present invention, there is provided a solid-state image sensor comprising:

a pixel section that outputs a signal charge subjected to photoelectric conversion by each of a plurality of photoelectric transducers;

a conversion circuit that converts an output signal from the pixel section into a digital signal by using a triangular wave;

a saturation signal level calculation circuit that calculates a saturation signal level of each photoelectric transducer based on the digital signal from the conversion circuit; and a setting circuit which sets a maximum signal level of the triangular wave in accordance with the saturation signal level from the saturation signal level calculation circuit.

According to a second aspect of the present invention, there is provided a signal processing method of calculating a saturation signal level in a solid-state image sensor comprising a saturation signal level calculation circuit according to the first aspect, the method comprising:

setting a measurement maximum signal level so that an amplitude level of a triangular wave becomes maximum and then using the triangular wave having the amplitude level set to the measurement maximum signal level to extract a digital signal on a minimum saturation level from a result obtained by subjecting a signal charge read to a detecting section to analog-to-digital conversion in order to remove a black defect and extract a signal level;

comparing the extracted digital signal on the minimum saturation level with a preset black defect level;

extracting a digital signal on a minimum level in a line when the extracted digital signal on the minimum saturation level is not the black defect;

repeating the operation, dividing the extracted digital signal on the minimum level by a value of a 1023-LSB level as a maximum value of 10 bits, and multiplying its quotient by a value of the measurement maximum signal level to calculate data which is required to reset an extraction maximum signal level that maximizes an amplitude level of the triangular level; and updating the extraction maximum signal level based on the calculated data so that the amplitude level of the triangular wave becomes optimum.

DETAILED DESCRIPTION OF THE INVENTION

Embodiments of the present invention will be described with reference to the accompanying drawings. It should be noted that the drawings are schematic ones and the dimension ratios shown therein are different from the actual ones. The dimensions vary from drawing to drawing and so do the ratios of dimensions. The following embodiments are directed to a device and a method for embodying the technical concept of the present invention and the technical concept does not specify the material, shape, structure or configuration of components of the present invention. Various changes and modifications can be made to the technical concept without departing from the scope of the claimed invention.

First Embodiment

Figure 1:
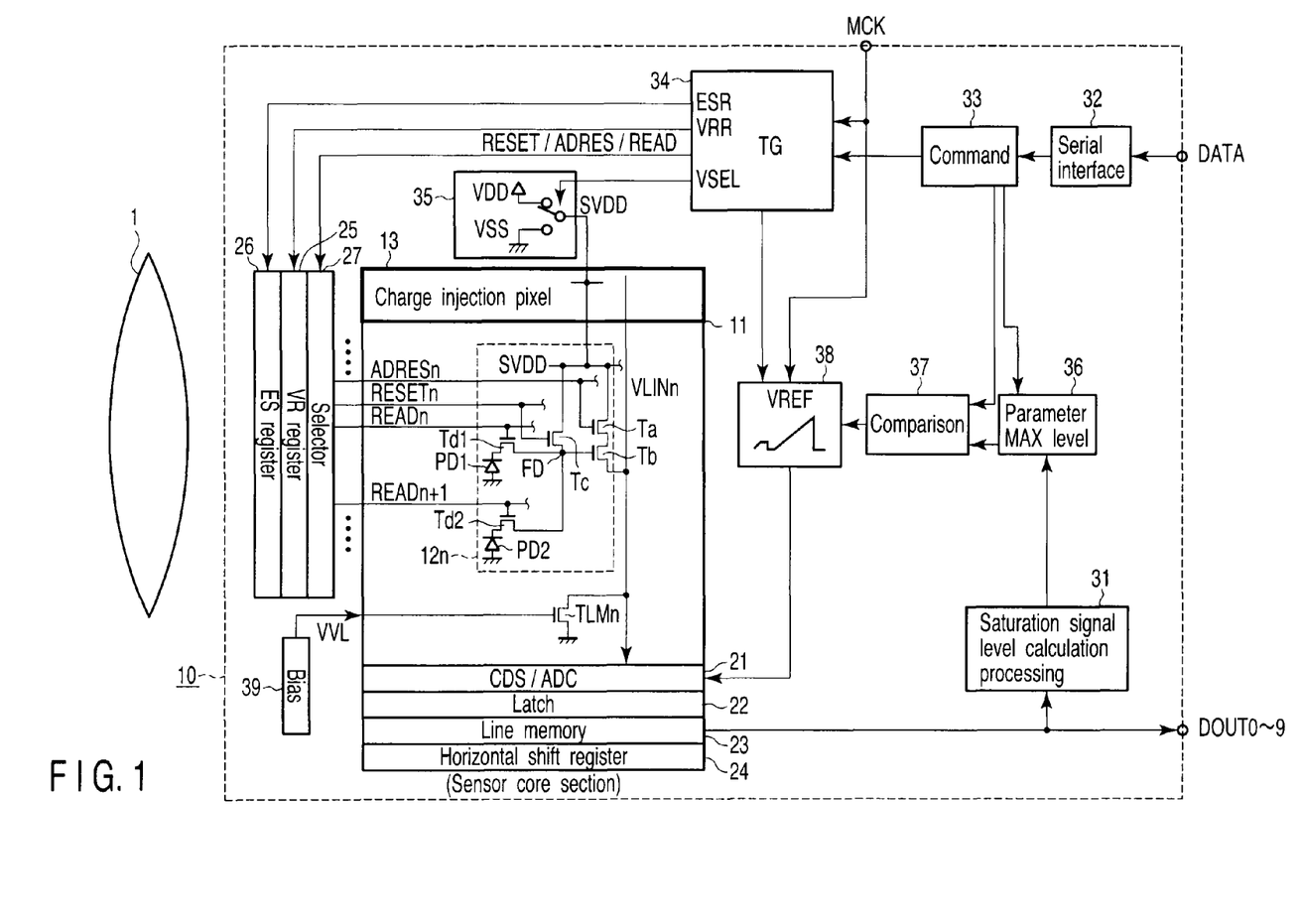
FIG. 1 is a block diagram showing a structural example of a solid-state image sensor (amplifying CMOS image sensor) according to a first embodiment of the present invention.

FIG. 1 shows a basic structure of a solid-state image sensor according to a first embodiment of the present invention. It is to be noted that an example of an amplifying CMOS image sensor having a vertical two-pixel one-cell structure will be explained in this embodiment. Further, one cell is exemplified as a pixel section.

A CMOS image sensor 10 is arranged behind a lens 1. For example, as shown in FIG. 1, this CMOS image sensor 10 has a pixel section 11 and also has a CDS/ADC circuit 21, a latch circuit 22, an 1H (horizontal) line memory 23, and a horizontal shift register 24 which are respectively provided below the pixel section 11. The CDS/ADC circuit 21 has a structure where a columnar noise canceling circuit (CDS) is integrated with an analog-to-digital converter (ADC). The latch circuit 22 latches a digital signal subjected to analog-to-digital conversion in the CDS/ADC circuit 21. The 1H line memory 23 stores a digital signal latched by the latch circuit 22. The horizontal shift register 24 reads a digital signals stored in the 1H line memory 23.

It is to be noted that the digital signal read from the 1H line memory 23 is output to the outside as each of sensor outputs DOUT0 to 9 of 10 bits (0 to 1023-LSB levels), and input to a saturation signal level calculation processing circuit 31. Further, the CDS/ADC circuit 21 according to this embodiment uses a triangular wave VREF generated by a later-explained VREF generation circuit 38 to judge 0 to 1023-LSB levels, thereby converting an analog output (signal charge) from the pixel section 11 into a digital signal.

A signal reading vertical register (VR register) 25, a storage time controlling vertical register (ES register) 26, and a pulse selector circuit 27 are provided on, e.g., a left-hand side of the pixel section 11. The VR register 25 and the ES register 26 select a vertical line of the pixel section 11. The pulse selector circuit 27 supplies each pulse of reset (RESETn)/ address (ADRESn)/read (READn, READn+1) to a cell 12n (where n=1, 2, . . . ) on a vertical line selected by the VR register 25 and the ES register 26.

Furthermore, in the CMOS image sensor 10 are provided a serial interface 32, a command control circuit 33, a timing generation (TG) circuit 34, a switching circuit 35, a parameter MAX level setting circuit 36, a comparison circuit 37, a VREF generation circuit 38, and others besides the saturation signal level calculation processing circuit 31. The saturation signal level calculation processing circuit 31 calculates a saturation signal level of a photodiode (photoelectric transducer) PDn from a digital signal read from the 1H line memory 23 at the time of a saturation signal reading operation (within a vertical blanking period) performed by the sensor.

The serial interface 32 fetches data DATA supplied from the outside, and feeds it to the command control circuit 33. The data DATA is used to control, e.g., a waveform amplitude and others of a later-explained triangular wave VREF. The command control circuit 33 generates command data corresponding to the data DATA from the serial interface 32, and outputs it to the TG circuit 34, the parameter MAX level setting circuit 36, and the comparison circuit 37. The TG circuit 34 controls the VR register 25, the ES register 26, the pulse selector circuit 27, the switching circuit 35, and the VREF generation circuit 38 in accordance with a main clock MCK from the outside and the command data from the command control circuit 33.

The switching circuit 35 is a drain voltage control circuit, and supplies either a VDD voltage or a VSS potential to the pixel section 11 as a drain voltage SVD when an output level is switched under control of the TG circuit 34 at the time of calculating a saturation signal level (within a vertical blanking period). The parameter MAX level setting circuit 36 sets a maximum signal level (VREF_M (measurement VREF amplitude parameter)) that is required to control an amplitude level of a triangular wave used in the CDS/ADC circuit 21 in accordance with the command data from the command control circuit 33. Furthermore, the parameter MAX level setting circuit 36 resets an optimum parameter MAX level based on calculated data from the saturation signal level calculation processing circuit 31 and outputs this level to the comparison circuit 37 at the time of a regular sensor operation (within a vertical effective scan period). That is, in this parameter MAX level setting circuit 36, an optimum parameter MAX level associated with a fluctuation of each sample and an environmental change is appropriately set and updated at the time of a regular sensor operation.

The comparison circuit 37 compares the parameter MAX level set by the parameter MAX level setting circuit 36 with the command data from the command control circuit 33, and outputs a comparison result to the VREF generation circuit 38. The VREF generation circuit 38 generates a triangular wave VREF that is used for analog-to-digital conversion processing in the CDS/ADC circuit 21. This VREF generation circuit 38 generates the triangular wave VREF having a desired amplitude level in accordance with the main clock MCK from the outside and the comparison result from the comparison circuit 37 under control of the TG circuit 34.

Here, when an amplitude level of the triangular wave VREF is too large, an inconvenience that a maximum value of a digital signal becomes smaller than a 1023-LSB level of 10 bits occurs. Thus, in this embodiment, in a regular sensor operation, the amplitude level of the triangular wave VREF is controlled in such a manner that it does not exceeds a saturation signal level of the photodiode by setting the parameter MAX level to a small value. To set the parameter MAX level to a small value, for example, rather the small command data is generated when the sensor is activated, or an initial value of the parameter MAX level is set to a small value when the power supply is turned on.

A plurality of cells 12n required to detect a signal charge are two-dimensionally arranged in an effective pixel section of the pixel section 11. Each cell 12n has a vertical two-pixel one-cell structure formed of five transistors (Ta, Tb, Tc, Td1, Td2) and two photodiodes (PD1, PD2). Moreover, a charge injection pixel 13 is provided, e.g., above (or below) the effective pixel section of this pixel section 11. The charge injection pixel 13 is formed of at least one set of cells (not shown) each having the same vertical two-pixel one-cell structure as the effective pixel section. It is to be noted that the plurality of charge injection pixels 13 may be provided to improve accuracy. Additionally, a drain voltage SVDD is supplied from the switching circuit 35 to the charge injection pixel 13 and each cell 12n, respectively.

On the other hand, a source follower circuit load transistor TLMn is provided, e.g., below the effective pixel section in accordance with each horizontal line. A drain of each load transistor TLMn is connected with a corresponding vertical signal line VLINn, and a source of the same is grounded. A bias voltage VVL is applied to a gate of each load transistor TLMn from a bias circuit 39.

The structure of the cell 12n will now be briefly explained. For example, one control circuit (the five transistors Ta, Tb, Tc, Td1, and Td2) is arranged with respect to each of the two photodiodes PD1 and PD2 in a vertical direction in the plurality of two-dimensionally arranged photodiodes, thereby constituting each cell 12n. When the cell 12n adopts a vertical two-pixel one-cell structure, an area of each photodiode can be substantially increased, thus improving degradation in sensitivity of a fine pixel.

The control circuit is formed of, e.g., a selector transistor Ta, an output (amplification) transistor Tb, a reset transistor Tc, and signal charge reading transistors Td1 and Td2. In short, each anode of the photodiodes PD1 and PD2 is grounded. Sources of the transistors Td1 and Td2 are connected with respective cathodes of the photodiodes PD1 and PD2. Read pulses READn and READn+1 are applied to respective gates (TG gates) of the transistors Td1 and Td2. A gate of the transistor Tb and a source of the transistor Tc are connected with respective drains of the transistors Td1 and Td2 in common. Further, this common connection point serves as a detecting section FD.

A reset pulse RESETn is applied to a gate of the transistor Tc, and the drain voltage SVDD is applied to a drain of the same. An address pulse ADRESn is applied to a gate of the transistor Ta. A source of the transistor Ta is connected with a drain of the transistor Tb, and the drain voltage SVDD is applied to a drain of the transistor Ta. A source of the transistor Tb is connected with a corresponding vertical signal line VLINn.

A signal charge reading operation in the above-mentioned structure will now be explained. For example, when reading a signal charge in a vertical line n, the address pulse ADRESn is used to turn on the transistor Ta, thereby operating a source follower circuit formed of the transistor Tb and the load transistor TLMn. The signal charge obtained by photoelectric conversion is stored in the photodiode PD1 for a fixed period, and then the reset pulse RESETn is turned on before reading this signal charge in order to remove a noise signal (leakage current) of, e.g., a dark current in the detecting section FD. As a result, the transistor Tc is turned on, and a potential in the detecting section FD is reset to a VDD voltage (e.g., 2.8 V).

On the other hand, a voltage (reset level) in a state where the detecting section FD has no signal as a reference is output to the vertical signal line VLINn. In this state, the read pulse READn is turned on in case of a first read line, thereby turning on the transistor Td1. In this manner, the signal charge stored in the photodiode PD1 is read to the detecting section FD. Then, a voltage (the signal charge+the reset level) in the detecting section FD is read to the vertical signal line VLINn. This reset level can be removed by taking a difference from the former reset level. That is, subtracting the reset level enables extracting a signal component (enabled signal) alone. This operation is called a noise reduction processing operation (correlated double sampling [CDS] operation).

The voltage (the signal charge) in the detecting section FD read to the vertical signal line VLINn in this manner is converted into a digital signal on 0 to 1023-LSB levels of 10 bits by using the triangular wave VREF produced in the VREF generation circuit 38 after the enabled signal is extracted by the CDS operation in the CDS/ADC circuit 21.

Likewise, in case of the next read line, the transistor Td2 is turned on by turning on the read pulse READn+1. A signal charge stored in the photodiode PD2 is read to the detecting section FD in this manner. Then, a voltage (the signal charge+a reset level) in the detecting section FD is read to the vertical signal line VLINn.

Thereafter, the same processing is repeated.

Figure 2:
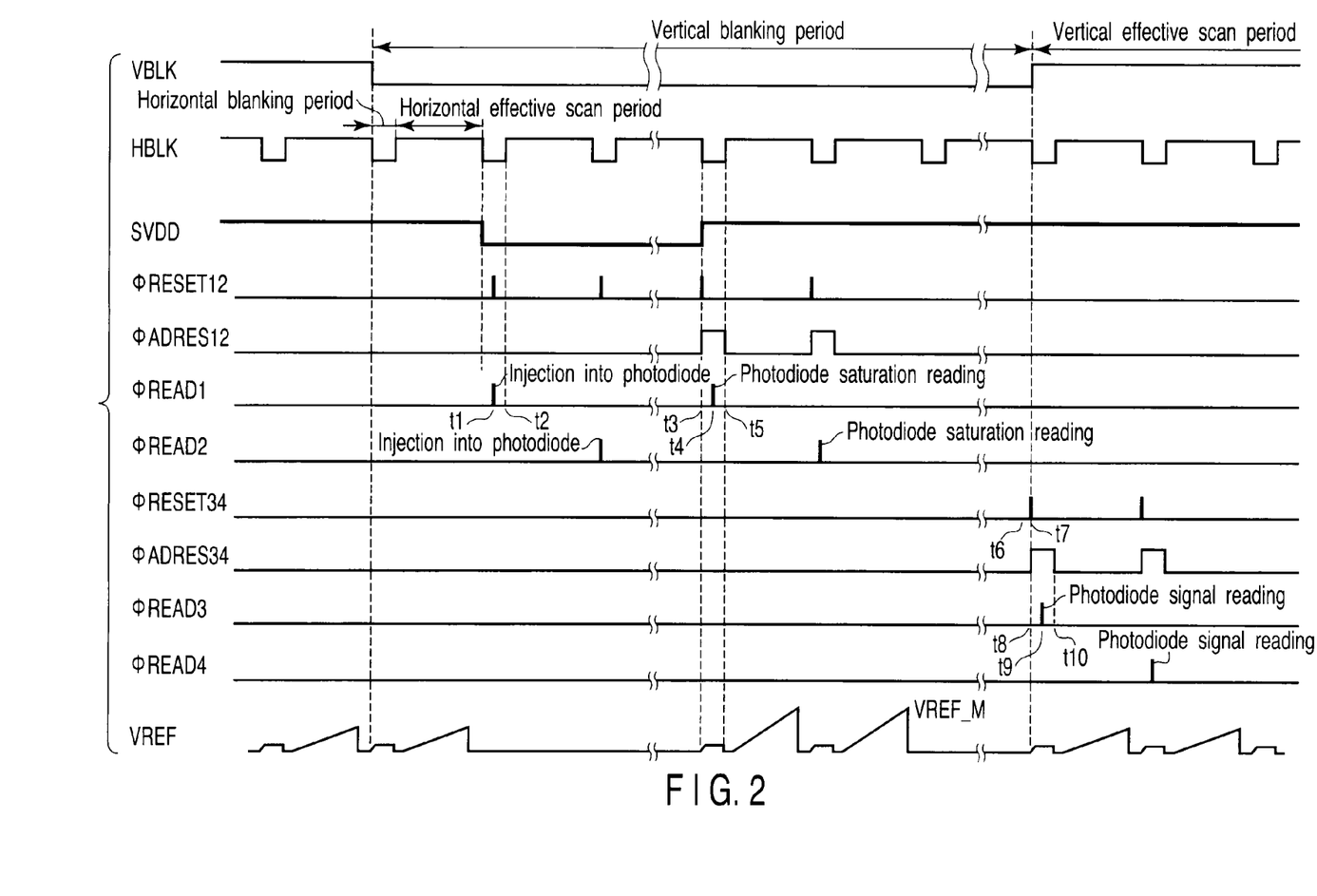
FIG. 2 is a timing chart for explaining an operation of the CMOS image sensor depicted in FIG. 1.

FIG. 2 shows an operation timing waveform of the CMOS image sensor 10. In this example, a description will be given as to a structure where the charge injection pixel 13 is formed of the photodiode PD1 of a first line and the photodiode PD2 of a second line.

Usually, the CMOS image sensor 10 operates in synchronization with a synchronization signal. A vertical synchronization pulse VBLK is divided into a vertical blanking period where an enabled signal in the pixel section 11 is not read and a vertical effective scan period where the enabled signal is read. In the vertical effective scan period, the enabled signal is sequentially read from, e.g., the photodiode PD1 of a third line excluding the charge injection pixel 13 (regular sensor operation). Further, a horizontal synchronization pulse HBLK is divided into a horizontal blanking period and a horizontal effective scan period.

In the vertical effective scan period, the TG circuit 34 first turns on a pulse ΦRESET 34 of the reset pulse RESETn at a time t7 in order to remove a leakage current in the detecting section FD. Furthermore, the address pulse ADRESn is turned on in a period from the time t7 to a time t10 (e.g., a first horizontal blanking period) so that a pulse ΦADRES 34 is made high. Moreover, at a time t9, a pulse ΦREAD 3 of the read pulse READn is turned on to read the signal charge stored in the photodiode PD1 of the third line (odd-numbered line or the first read line) to the detecting section FD.

As a CDS operation, a signal difference operation at a time t8 and a time t10 is carried out. Therefore, in the next horizontal blanking period, the pulse ΦRESET 34 of the reset pulse RESETn, the pulse ΦADRES 34 of the address pulse ADRESn, and a pulse ΦREAD 4 of the read pulse READn are likewise turned on. As a result, a signal charge stored in the photodiode PD2 of a fourth line (even-numbered line or the next read line) is read to the detecting section FD.

On the other hand, in the vertical blanking period, the TG circuit 34 first controls, e.g., the switching circuit 35 in a given horizontal blanking period to inject a signal charge on a saturation level into the photodiodes PD1 and the PD2 of the first line and the second line of the charge injection pixel 13. Therefore, at a time t1, a pulse ΦRESET 12 of the reset pulse RESETn and a pulse ΦREAD 1 of the read pulse READn are simultaneously turned on (made high). At this time, the drain voltage SVDD is set to zero (the VSS potential). Based on this operation, the signal charge on the saturation level is injected into the photodiode PD1 of the first line.

Likewise, in the next horizontal blanking period, the TG circuit 34 makes the pulse ΦRESET 12 of the reset pulse RESETn and a pulse ΦREAD 2 of the read pulse READn high. The TG circuit 34 controls a phase of the pulse ΦRESET 12 in such a manner that the pulse ΦRESET 12 is made high simultaneously with the pulse ΦREAD 2. Additionally, the drain voltage SVDD is set to zero so that the signal charge on the saturation level can be injected into the photodiode PD2 of the second line. This operation may be concurrently performed by simultaneously making the pulses ΦREAD 1 and ΦREAD 2 of the read pulse READn high.

The signal charge injected to the photodiodes PD1 and PD2 is read in the vertical blanking period. That is, at a time t3, the TG circuit 34 first turns on the pulse ΦRESET 12 of the reset pulse RESETn in order to remove a leakage current in the detecting section FD. Furthermore, in a period from the time t3 to a time t5, it turns on the address pulse ADRESn so that the pulse ΦADRES 12 is made high. Moreover, at a time t4, it turns on the pulse ΦREAD 1 of the read pulse READn to read the signal charge on the saturation level injected in the photodiode PD1 of the first line to the detecting section FD.

In the CDS/ADC circuit 21, the saturation signal charge (the signal charge on the saturation level) of the photodiode PD1 of the first line can be obtained by using an output from the photodiode PD1 of the first line to perform the CDS operation.

Likewise, in the next horizontal blanking period, the pulse PRESET 12 of the reset pulse RESETn, the pulse ΦADRES 12 of the address pulse ADRESn, and a pulse ΦREAD 2 of a read pulse READn+1 are turned on. As a result, the saturation signal charge of the photodiode PD2 of the second line can be obtained from an output from the photodiode PD2 of the second line by the CDS operation in the CDS/ADC circuit 21.

At the time of the CDS operation, the triangular wave VREF supplied to the CDS/ADC circuit 12 is set to be larger than that in the regular sensor operation so that an amplitude level of this triangular wave becomes VREF_M (measurement VREF amplitude parameter). Setting the triangular wave in this manner enables preventing the digital signal from being clipped by analog-to-digital conversion of 10 bits. That is, when the amplitude level of this triangular wave VREF is set to a waveform amplitude on a parameter MAX level that is set based on calculation data obtained by calculation in the saturation signal level calculation processing circuit 31 and optimum for a fluctuation of each sample and an environmental change in the regular sensor operation, the 10-bit digital signal on the 1023-LSB level can be obtained.

FIGS. 3A and 3B to FIGS. 12A and 12B show a change in a potential at each time in the operation timing waveform depicted in FIG. 2. Here, an example where the photodiode PD1 is a target will be explained to facilitate understanding. It is to be noted that A of each drawing is a view partially showing a cross-sectional structure of the pixel section 11, and B of the same is a view showing a state of a potential at the respective times t1 to t10. Additionally, FIGS. 3A and 3B to FIGS. 7A and 7B show the time of the saturation level signal charge injection/reading with respect to the photodiode PD1, and FIGS. 8A and 8B to FIGS. 12A and 12B show the time of reading the enabled signal from the photodiode PD1.

Figure 3A:
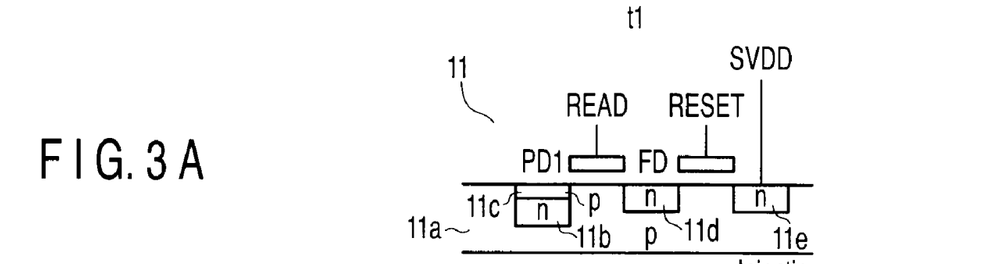
FIGS. 3A and 3B are views showing a potential in a pixel section at a time t1 in FIG. 2.

In the pixel section 11, an n-type PD layer 11b serving as the photodiode PD1 is formed in a surface portion of a p-type semiconductor substrate 11a corresponding to the cross section in the drawing. A surface of the PD layer 11b is shielded by a p-type layer 11c. As a result, the buried photodiode PD1 having less unevenness at the time of defects or darkness is realized (although not shown for the sake of convenience, the photodiode PD2 is likewise formed in another cross section).

Further, the transistors Td1 and Tc are formed in the same cross section in the drawing. That is, the n-type layer 11d serving as a drain of the signal charge reading transistor Td1 and a source of the reset transistor Tc and the n-type layer 11e functioning as a drain of the reset transistor Tc are formed in the surface portion of the p-type semiconductor substrate 11a corresponding to the cross section in the drawing, respectively. A gate (READ) of the signal charge reading transistor Td1 is formed on the surface of the p-type semiconductor substrate 11a at a position corresponding to a space between the PD layer 11b and the n-type layer 11d. A gate (RESET) of the reset transistor Tc is formed on the surface of the p-type semiconductor substrate 11a at a position corresponding to a space between the n-type layer 11d and the n-type layer 11e. Each of the gates (READ and RESET) is formed of, e.g., polysilicon.

It is to be noted that the n-type layer 11d functions as the detecting section FD in this embodiment. Furthermore, the drain voltage SVDD is supplied to the n-type layer (the drain of the reset transistor Tc) 11e from the switching circuit 35.

Operations for injecting the saturation signal charge into the photodiode PD1 and reading the injected saturation signal charge at the time of level setting will be first explained.

Figure 3B:
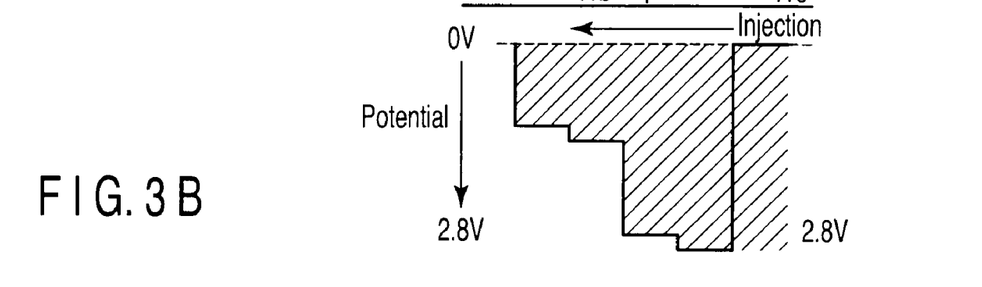

At the time t1, for example, as shown in FIGS. 3A and 3B, the signal charge reading transistor Td1 and the reset transistor Tc associated with the photodiode PD1 of the first line are turned on (the gates READ and RESET are made high) to set the drain voltage SVDD to zero. As a result, the signal charge on the saturation level is injected into the photodiode PD1.

Figure 4A:
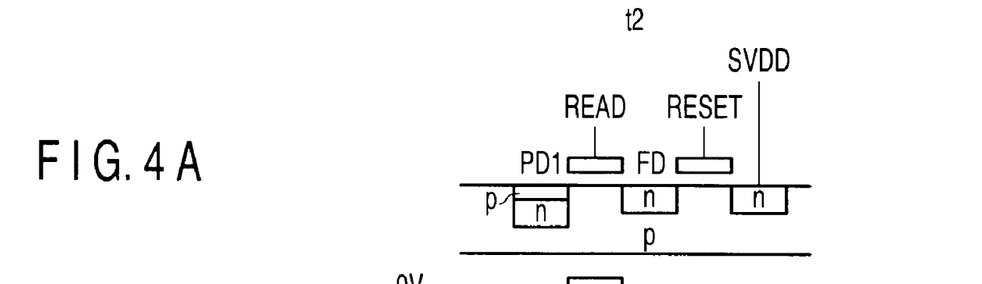
FIGS. 4A and 4B are views showing a potential in the pixel section at a time t2 in FIG. 2.
Figure 4B:
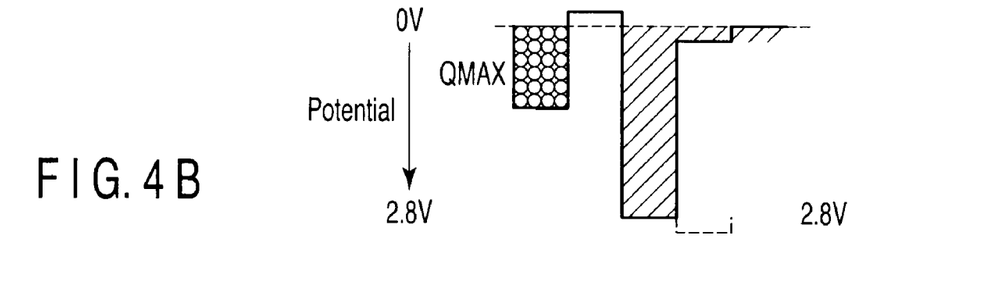

At the time t2, for example, as shown in FIGS. 4A and 4B, the signal charge reading transistor Td1 and the reset transistor Tc associated with the photodiode PD1 of the first line are turned off (the gates READ and RESET are changed to a low (LO) level) to keep the drain voltage SVDD to zero (alternatively, the drain voltage SVDD may be switched to 2.8 V).

Figure 5A:
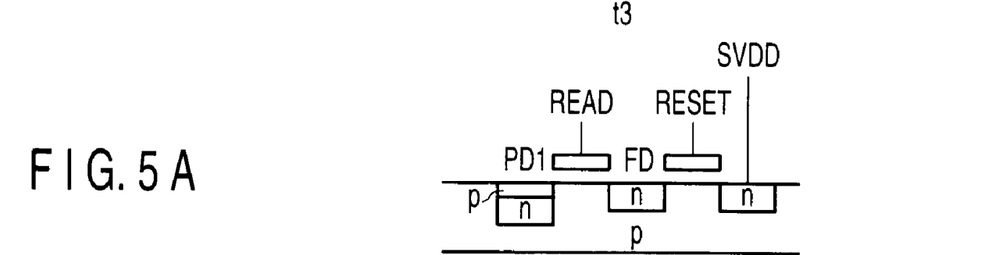
FIGS. 5A and 5B are views showing a potential in the pixel section at a time t3 in FIG. 2.
Figure 5B:
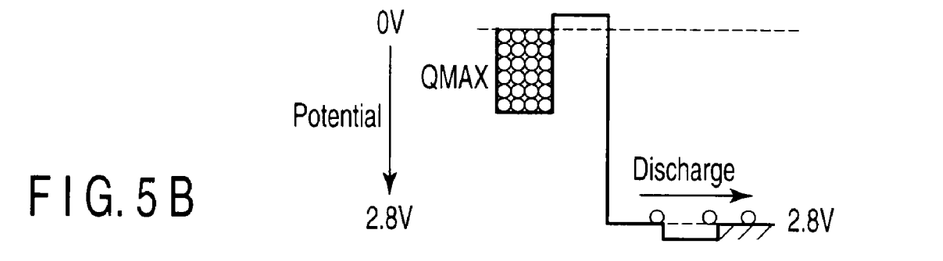

At the time t3, for example, as shown in FIGS. 5A and 5B, the drain voltage SVDD associated with the photodiode PD1 of the first line is set to the VDD voltage (2.8 V) to turn on the reset transistor Tc. As a result, an unnecessary charge (leakage current) in the detecting section FD is discharged. It is to be noted that a signal charge QMAX on the saturation level is held in the photodiode PD1.

Figure 6A:
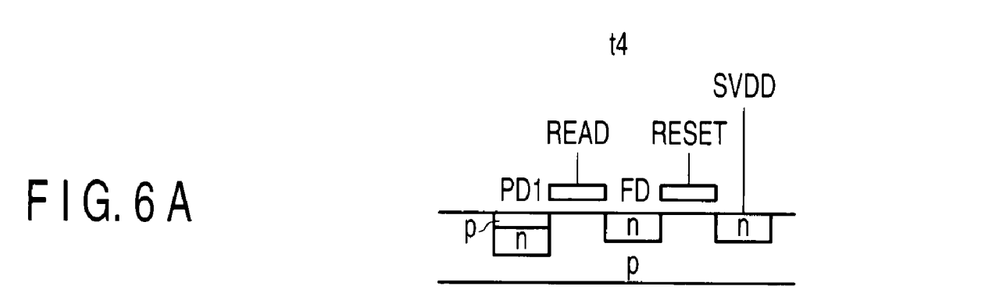
FIGS. 6A and 6B are views showing a potential in the pixel section at a time t4 in FIG. 2.
Figure 6B:
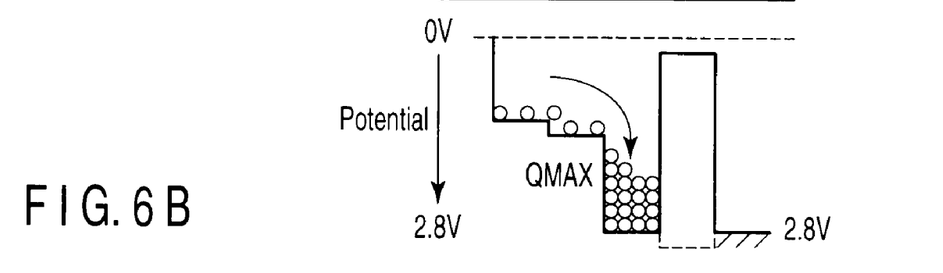

At the time t4, for example, as shown in FIGS. 6A and 6B, the reset transistor Tc associated with the photodiode PD1 of the first line is turned off, and the signal charge reading transistor Td1 is turned on. As a result, the signal charge QMAX on the saturation level in the photodiode PD1 is read to the detecting section FD.

Figure 7A:
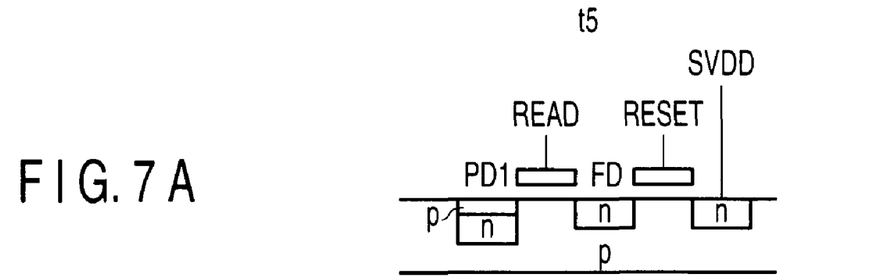
FIGS. 7A and 7B are views showing a potential in the pixel section at a time t5 in FIG. 2.
Figure 7B:
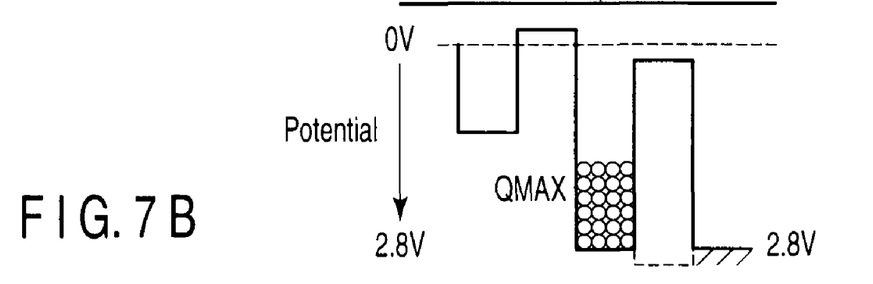

At the time t5, for example, as shown in FIGS. 7A and 7B, the signal charge reading transistor Td1 is turned off after the signal charge QMAX on the saturation level is all read to the detecting section FD from the photodiode PD1 of the first line.

In this manner, the operations for injecting the saturation signal charge into the photodiode PD1 and reading the injected saturation signal charge are carried out.

An operation when reading the signal charge stored in the photodiode PD1 of the first read line at the time of the regular sensor operation will now be explained.

Figure 8A:
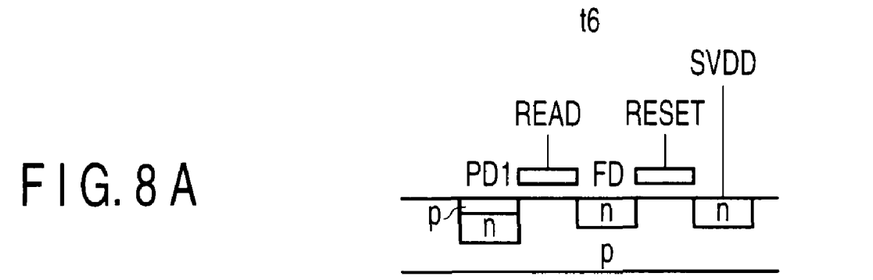
FIGS. 8A and 8B are views showing a potential in the pixel section at a time t6 in FIG. 2.
Figure 8B:
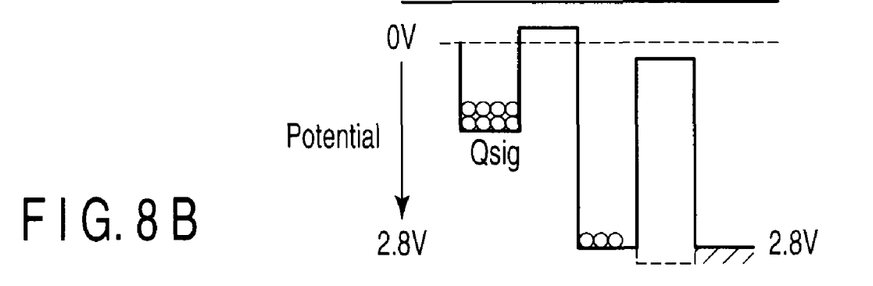
Figure 9A:
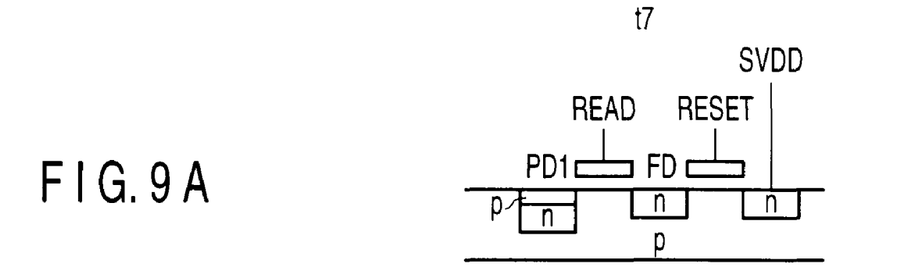
FIGS. 9A and 9B are views showing a potential in the pixel section at a time t7 in FIG. 2.
Figure 9B:
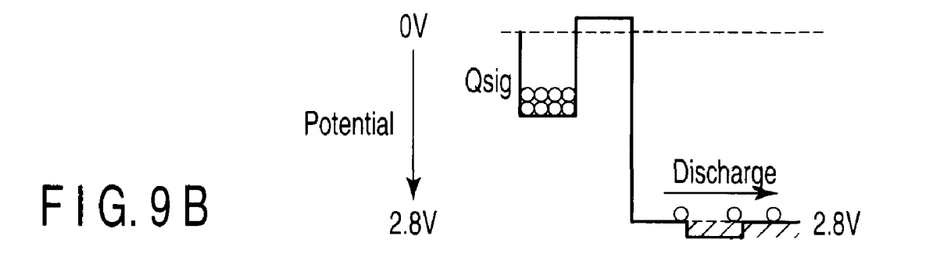
Figure 10A:
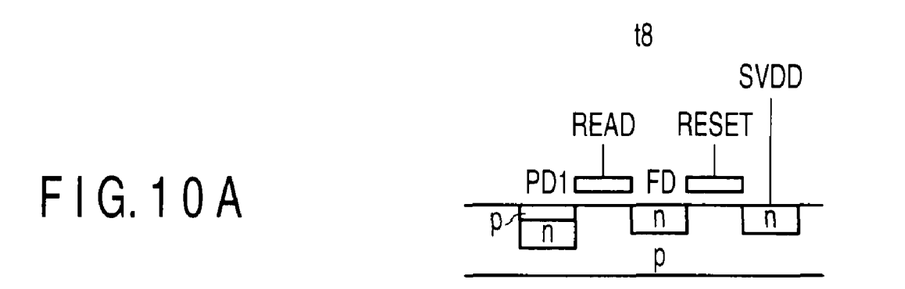
FIGS. 10A and 10B are views showing a potential in the pixel section at a time t8 in FIG. 2.
Figure 10B:
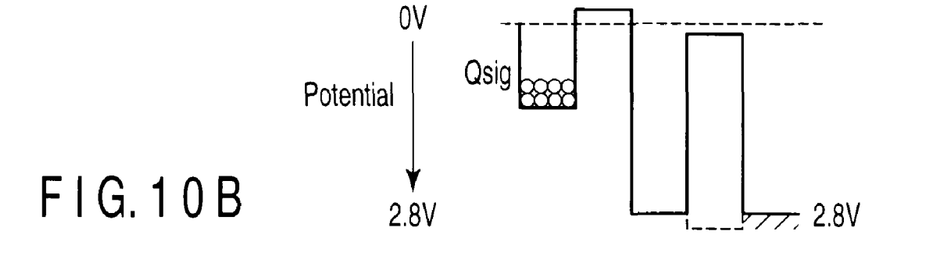

At the time t6, for example, as shown in FIGS. 8A and 8B, a signal charge Qsig as an enabled signal has been already stored in the photodiode PD1 of the first read line. On the other hand, an unnecessary charge, e.g., a leakage current is produced in the detecting section FD.

At the times t7 and t8, for example, as shown in FIGS. 9A and 9B and FIGS. 10A and 10B, the reset transistor Tc associated with the photodiode PD1 of the first read line is turned on to discharge the unnecessary charge in the detecting section FD to the switching circuit 35. Then, the reset transistor Tc is turned off.

Figure 11A:
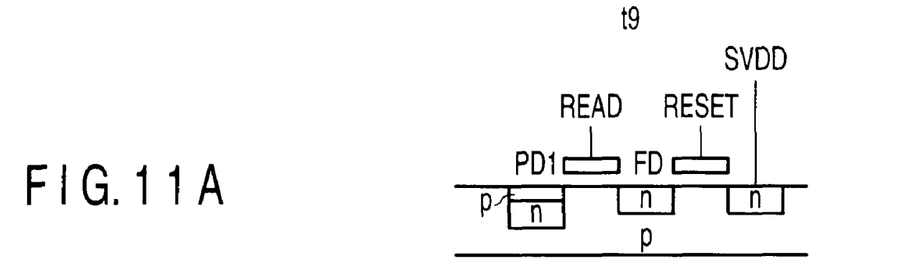
FIGS. 11A and 11B are views showing a potential in the pixel section at a time t9 in FIG. 2.
Figure 11B:
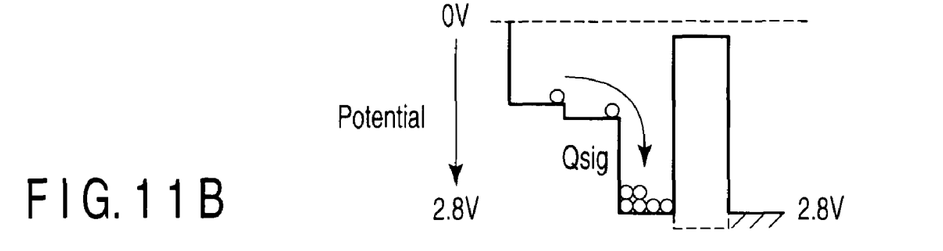

At the time t9, for example, as shown in FIGS. 11A and 11B, the signal charge reading transistor Td1 associated with the photodiode PD1 of the first read line is turned on. As a result, the signal charge Qsig stored in the photodiode PD1 is all read to the detecting section FD.

Figure 12A:
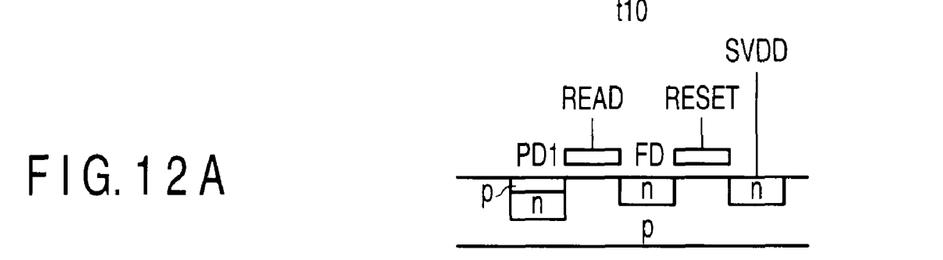
FIGS. 12A and 12B are views showing a potential in the pixel section at a time t10 in FIG. 2.
Figure 12B:
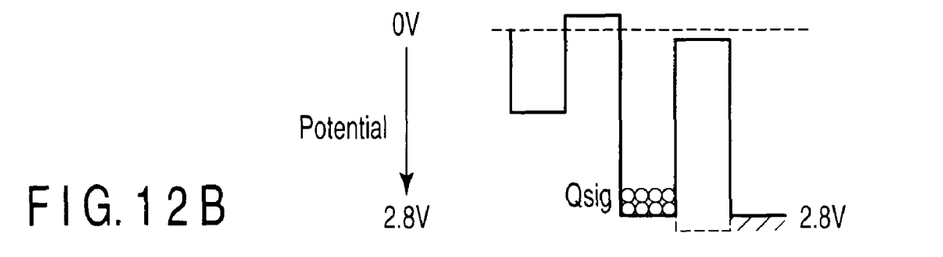

At the time t10, for example, as shown in FIGS. 12A and 12B, the signal charge reading transistor Td1 is turned off after the signal charge Qsig in the photodiode PD1 is all read to the detecting section FD.

In this manner, the operation for reading the signal charge Qsig stored in the photodiode PD1 is performed.

Figure 13:
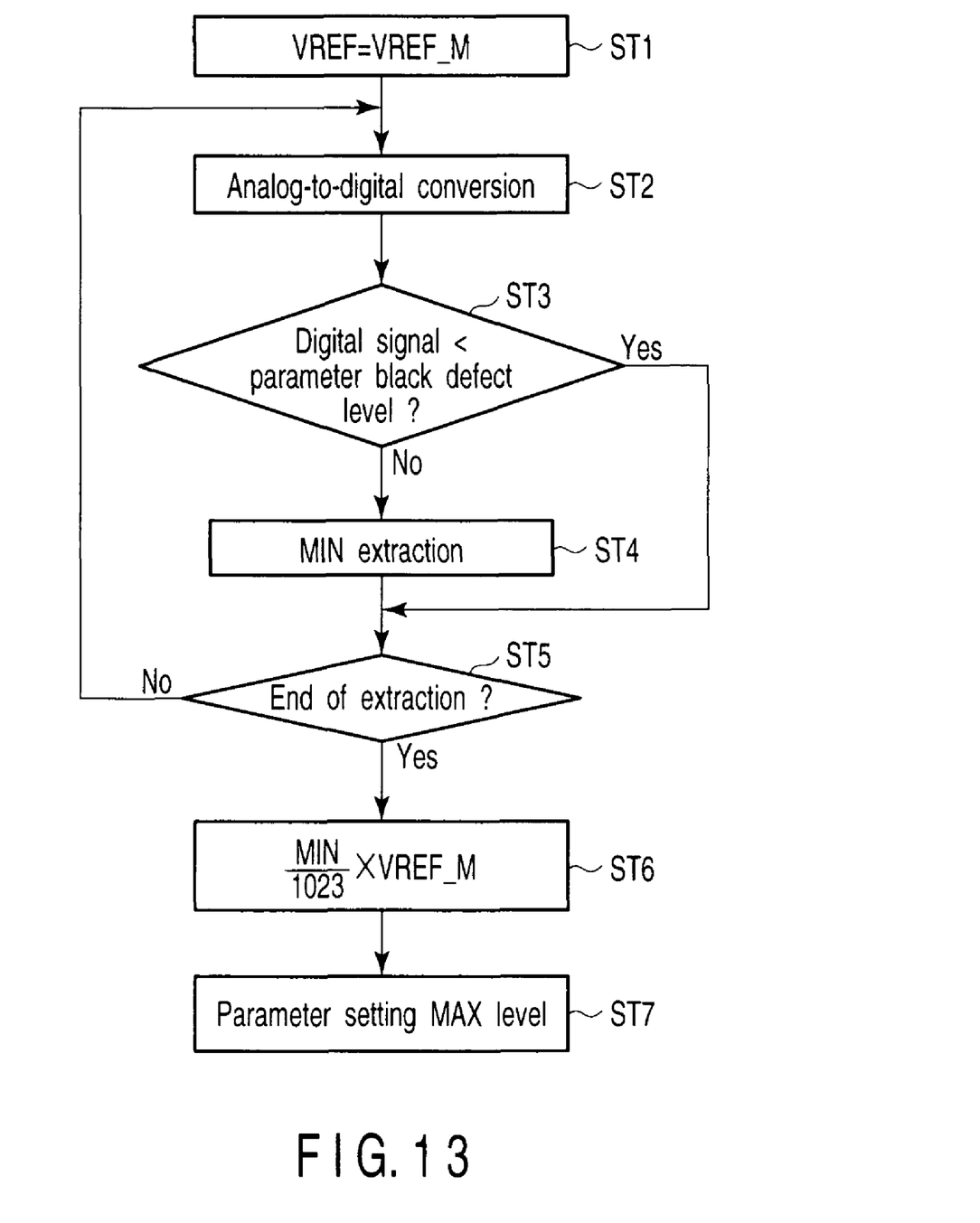
FIG. 13 is a flowchart for explaining a flow of processing for calculation of a saturation signal level.

FIG. 13 is a view for explaining a flow of processing in the saturation signal level calculation processing circuit 31. An example where removal of a black defect and extraction of a first signal level on a line are carried out will now be explained.

Before performing calculation processing in the saturation signal level calculation processing circuit 31, the measurement VREF amplitude parameter VERF_M is set to maximize an amplitude level of the triangular wave VREF in order to enable measuring a saturation signal level (step ST1). This setting is performed by executing the operation for level setting in a vertical blanking period.

Furthermore, the triangular wave VREF having a large amplitude level VREF_M is used to subject the signal charge read to the detecting section FD to analog-to-digital conversion (step ST2). The digital signal subjected to analog-to-digital conversion processing has unevenness in a saturation level of the photodiode in accordance with each cell even within the same line or between lines. Therefore, a minimum saturation level of the digital signal is extracted.

In this state, the saturation signal level calculation processing circuit 31 compares a parameter black defect level with the digital signal to avoid extraction of a black defect (step ST3). If the black defect is determined, extraction processing is stopped. If the black defect is not determined, a digital signal (MIN level) that is minimum in an extraction target line is extracted (step ST4).

The above-explained operation is repeated up to the photodiode PD2 at the end of the second line (the next read line) (step ST5).

At last, the extracted minimum MIN level is divided by a value of the 1023-LSB level, and its quotient is multiplied by a value of the measurement VREF amplitude parameter VREF_M to calculate data required to reset the parameter MAX level (step ST6).

Then, based on this calculation data (assuming that the calculation data linearly varies), the parameter MAX level is updated so that the amplitude level of the triangular wave VERF becomes optimum (step ST7).

As explained above, the amplitude level of the triangular wave VREF that is set to become maximum at the time of level setting (vertical blanking period) can be optimized in accordance with the saturation signal level of the photodiode extracted based on an actual digital signal at the time of the regular sensor operation (vertical effective scan period). That is, sequentially extracting the saturation signal level of the photodiode as each sample and optimizing the amplitude level of the triangular wave VREF enables setting a saturation electron number of the photodiode to a maximum extent in any operation environment. Therefore, in a general room temperature state, the saturation electron number of the photodiode can be set to a value that is 1.4 to 1.7 times a conventional value, thereby greatly improving the signal-to-noise ratio to approximately 2.9 to 4.6 dB.

As explained above, the maximum saturation electron number can be obtained in the image sensor at a regular room temperature, and the operation can be constantly performed on the maximum saturation signal level. That is, the signal charge as the saturation signal level is periodically injected into the photodiode, and the triangular wave VREF having the optimum amplitude level is generated based on the parameter MAX level associated with this injected signal charge. As a result, even when the photodiode is operated with the maximum saturation electron number, the saturation signal on the 1023-LSB level can be constantly obtained (in case of analog-to-digital conversion processing of 10 bits). Therefore, even in a high-temperature (temperature characteristic compensation) state of 60° C., the image sensor that can constantly operate on the maximum saturation signal level to, e.g., improve degradation in signal-to-noise ration due to shot noise can be realized.

Although the example of the analog-to-digital conversion circuit including the columnar noise canceling circuit has been explained in the foregoing embodiment, the present invention is not restricted thereto, and it can be also applied to an analog-to-digital conversion circuit including, e.g., a flash-type noise canceling circuit.

Further, although injection and reading of the signal charge on the saturation signal level are performed within the vertical blanking period, these operations may be carried out when turning on a power supply of a camera on which the sensor is mounted.

Furthermore, the present invention is not restricted to the two-pixel one-cell structure as the pixel structure, and it can be also applied to, e.g., a one-pixel one-cell structure or a four-pixel one-cell structure. Moreover, the present invention can be likewise applied to a pixel having a structure including no selector transistor.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A solid-state image sensor comprising:
    a pixel section that outputs a signal charge subjected to photoelectric conversion by each of a plurality of photoelectric transducers;
    a conversion circuit that converts an output signal from the pixel section into a digital signal by using a triangular wave;
    a saturation signal level calculation circuit that calculates a saturation signal level of each photoelectric transducer based on the digital signal from the conversion circuit; and
    a setting circuit which sets a maximum signal level of the triangular wave in accordance with the saturation signal level from the saturation signal level calculation circuit, wherein
    the pixel section further has at least one charge injection cell, and
    injection and reading of a signal charge on a saturation level are carried out within a vertical blanking period in the at least one charge injection cell.

2. The solid-state image sensor according to claim 1, wherein the pixel section includes a plurality of two-dimensionally arranged cells and the at least one charge injection cell,
    each of the plurality of cells and the at least one charge injection cell has a two-pixel one-cell structure including a first photoelectric transducer, a first reading transistor that reads a signal charge in the first photoelectric transducer to a detecting section, a second photoelectric transducer, a second reading transistor that reads a signal charge in the second photoelectric transducer to the detecting section, a first reset transistor that resets a charge in the detecting section, and a first amplification transistor that amplifies the signal charge read to the detecting section, and the solid-state image sensor further comprises a drain voltage control circuit that controls a drain voltage of the first reset transistor.

3. A signal processing method of calculating a saturation signal level in a solid-state image sensor comprising a saturation signal level calculation circuit including:

a pixel section that outputs a signal charge subjected to photoelectric conversion by each of a plurality of photoelectric transducers;

a conversion circuit that converts an output signal from the pixel section into a digital signal by using a triangular wave;

a saturation signal level calculation circuit that calculates a saturation signal level of each photoelectric transducer based on the digital signal from the conversion circuit; and a setting circuit which sets a maximum signal level of the triangular wave in accordance with the saturation signal level from the saturation signal level calculation circuit, wherein the method comprises:

setting a measurement maximum signal level so that an amplitude level of a triangular wave becomes maximum and then using the triangular wave having the amplitude level set to the measurement maximum signal level to extract a digital signal on a minimum saturation level from a result obtained by subjecting a signal charge read to a detecting section to analog-to-digital conversion in order to remove a black defect and extract a signal level;

comparing the extracted digital signal on the minimum saturation level with a preset black defect level;

extracting a digital signal on a minimum level in a line when the extracted digital signal on the minimum saturation level is not the black defect;

repeating the operation, dividing the extracted digital signal on the minimum level by a value of a 1023-LSB level as a maximum value of 10 bits, and multiplying its quotient by a value of the measurement maximum signal level to calculate data which is required to reset an extraction maximum signal level that maximizes an amplitude level of the triangular wave; and updating the extraction maximum signal level based on the calculated data so that the amplitude level of the triangular wave becomes optimum.

4. The method according to claim 3, wherein the measurement maximum signal level is set by executing a level setting operation within a vertical blanking period.

5. The method according to claim 3, wherein, when the extracted digital signal on the minimum saturation level is the black defect, subsequent processing is stopped.

6. The method according to claim 3, comprising using the triangular wave having the amplitude level set to the extraction maximum signal level to subject the signal charge read to the detecting section to analog-to-digital conversion within a vertical effective scan period.

* * * * *